(12) United States Patent
Bell et al.

(10) Patent No.: US 11,737,474 B2
(45) Date of Patent: Aug. 29, 2023

(54) PROTEIN CONCENTRATES FROM OIL SEEDS AND METHODS OF PRODUCING THE SAME

(71) Applicant: CARGILL, INCORPORATED, Wayzata, MN (US)

(72) Inventors: Eric Bell, Blair, NE (US); Erin Kathleen Marasco, Excelsior, MN (US); Keith John Mertz, Blair, NE (US); Sanjay Sarang, Dublin, OH (US); Ping Yang, Dayton, OH (US)

(73) Assignee: Cargill, Incorporated, Wayzata, MN (US)

( * ) Notice: Subject to any disclaimer, the term of this patent is extended or adjusted under 35 U.S.C. 154(b) by 1303 days.

(21) Appl. No.: 16/076,052

(22) PCT Filed: Feb. 8, 2017

(86) PCT No.: PCT/US2017/016988
§ 371 (c)(1),
(2) Date: Aug. 7, 2018

(87) PCT Pub. No.: WO2017/139362
PCT Pub. Date: Aug. 17, 2017

(65) Prior Publication Data
US 2021/0186050 A1  Jun. 24, 2021

Related U.S. Application Data

(60) Provisional application No. 62/303,609, filed on Mar. 4, 2016, provisional application No. 62/292,533, filed on Feb. 8, 2016.

(51) Int. Cl.
*A23J 1/14* (2006.01)
*A23J 1/16* (2006.01)
*A23J 3/16* (2006.01)

(52) U.S. Cl.
CPC .. *A23J 1/14* (2013.01); *A23J 1/16* (2013.01); *A23J 3/16* (2013.01)

(58) Field of Classification Search
CPC ....... A23V 2250/5488; A23J 3/16; A23J 1/14; A23J 3/14; A23J 3/34; A23J 1/142;
(Continued)

(56) References Cited

U.S. PATENT DOCUMENTS 2,297,685 A    10/1942  Brier et al.
2,460,627 A *   2/1949  Erkko et al. ........... C07K 1/145
                                                    530/378
(Continued)

FOREIGN PATENT DOCUMENTS

CL    199500012    12/1995
CL    199801239    12/1998
(Continued)

OTHER PUBLICATIONS

International Search Report dated Apr. 21, 2017 for PCT/US2017/016988 filed Feb. 8, 2017 (3 pages).
(Continued)

*Primary Examiner* — Hong T Yoo

(57) ABSTRACT

A method of preparing a protein concentrate and protein concentrate compositions are described. The method relates to combining an aqueous process stream from a grain milling process with an oil seed material to form a slurry, steeping the slurry, and isolating a protein concentrate from the slurry. In one embodiment, the aqueous process stream comprises a soluble protein. In some embodiments, the method includes additional steps such as enzymatic treatment, washing of the isolated protein concentrate, and drying the protein concentrate.

19 Claims, 5 Drawing Sheets

(58) Field of Classification Search
CPC .. A23J 3/346; A23J 1/006; A23J 1/148; A23J 1/125; A23K 10/30; A23L 11/07; A23L 11/33
See application file for complete search history.

(56) References Cited

U.S. PATENT DOCUMENTS

| | | | |
|---|---|---|---|
| 2,461,404 | A | 2/1949 | Wormell et al. |
| 2,881,076 | A | 4/1959 | Sair |
| 3,809,767 | A | 5/1974 | Sair |
| 5,064,655 | A | 11/1991 | Uster |
| 2004/0128713 | A1 | 7/2004 | Hitz et al. |
| 2013/0142905 | A1 | 6/2013 | Gibbons et al. |

FOREIGN PATENT DOCUMENTS

| | | |
|---|---|---|
| EP | 0925723 A1 | 6/1999 |
| EP | 1528068 A1 | 5/2005 |
| GB | 1502959 A | 3/1978 |
| JP | 2002051706 A | 2/2002 |
| JP | 5407858 B2 | 12/2009 |
| WO | 2005074704 A1 | 8/2005 |

OTHER PUBLICATIONS

Barrows et al., "Supplementation of plant-based diets for rainbow trout (*Oncorhynchus mykiss*) with macro-minerals and inositol." Aquaculture Nutrition 16, No. 6 (2010): 654-661.

Barrows et al., "The effect of vitamin premix in extruded plant-based and fish meal based diets on growth efficiency and health of rainbow trout, *Oncorhynchus mykiss*." Aquaculture 283, No. 1-4 (2008): 148-155.

Brown et al., "Use of soy protein concentrates and lecithin products in diets fed to coho and Atlantic salmon." Journal of the American Oil Chemists' Society 74, No. 3 (1997): 187-193.

Bureau et al., "Apparent digestibility of rendered animal protein ingredients for rainbow trout (*Oncorhynchus mykiss*)." Aquaculture 180, No. 3-4 (1999): 345-358.

Cho et al., "Bioenergetics of salmonid fishes: energy intake, expenditure and productivity." Comparative Biochemistry and Physiology Part B: Comparative Biochemistry 73, No. 1 (1982): 25-41.

Ellis et al., "Quantitative determination of phytate in the presence of high inorganic phosphate." Analytical Biochemistry 77, No. 2 (1977): 536-539.

Forster, "A note on the method of calculating digestibility coefficients of nutrients provided by single ingredients to feeds of aquatic animals." Aquaculture Nutrition 5, No. 2 (Jun. 1999): 143-145.

Gaylord et al., "Apparent amino acid availability from feedstuffs in extruded diets for rainbow trout *Oncorhynchus mykiss*." Aquaculture Nutrition 16, No. 4 (2010): 400-406.

Gaylord et al., "Apparent digestibility of gross nutrients from feedstuffs in extruded feeds for rainbow trout, *Oncorhynchus mykiss*." Journal of the World Aquaculture Society 39, No. 6 (2008): 827-834.

Gaylord et al., "Apparent digestibility of nutrients and energy in extruded diets from cultivars of barley and wheat selected for nutritional quality in rainbow trout *Oncorhynchus mykiss*." Aquaculture Nutrition 15, No. 3 (2009): 306-312.

Watson & Ramstad, ed. (1987), Corn: Chemistry and Technology, Ch. 11, American Association of Cereal Chemist, Inc., St. Paul, Minn., 25 pages.

Watson & Ramstad, ed. (1987), Corn: Chemistry and Technology, Ch. 12 American Association of Cereal Chemist, Inc., St. Paul, Minn., 21 pages.

Watson & Ramstad, ed. (1987), Corn: Chemistry and Technology, Ch. 19, American Association of Cereal Chemist, Inc., St. Paul, Minn., 22 pages.

\* cited by examiner

PROTEIN CONCENTRATES FROM OIL SEEDS AND METHODS OF PRODUCING THE SAME

CROSS-REFERENCE TO RELATED APPLICATIONS

This application is a national phase application of PCT/US2017/016988, filed Feb. 8, 2017, which claims the benefit of U.S. Provisional Patent Application No. 62/292,533, filed Feb. 8, 2016, and U.S. Provisional Patent Application No. 62/303,609, filed Mar. 4, 2016, each of which are hereby incorporated by reference in its entirety.

BACKGROUND OF THE INVENTION

The need for high-quality protein concentrates from sustainable plant sources for use in animal feeds, especially nutrient-dense aqua feeds, such as feeds for salmon and other marine species, continues to grow. World salmon production is expected to grow 8% year over year for the next ten to fifteen years, with other marine species' farm production possibly growing even more rapidly. It is expected that the need for protein concentrates to support such aquaculture will grow by more than 250,000 tons annually.

SUMMARY OF THE INVENTION

Disclosed herein are protein concentrates and methods of preparing protein concentrates. Aspects of the disclosure are particularly directed to protein concentrates prepared by combining grain milling process streams, such as corn light steep water, with an oil seed material, such as soy bean meal. In one aspect, the protein concentrates can be used to produce a vegetable protein product or an animal feed diet.

In one aspect, a method of preparing a protein concentrate is described, comprising: combining a steeping media and an oil seed material to provide a slurry; optionally adjusting the pH of the slurry; optionally adding one or more enzymes to the steeping media or the slurry; steeping the slurry; and isolating a protein concentrate from the slurry. In some embodiments, the isolated protein concentrate is washed with a wash media one or more times. In some embodiments, the method further comprises a drying step for drying the isolated protein concentrate. In some embodiments, the oil seed material is derived from an oil seed selected from the group consisting of a soybean, a canola seed, a peanut, a sunflower seed, a flax seed, a cotton seed, a rape seed, and combinations thereof. In some embodiments, oil seed material is a de-hulled oil seed. In some embodiments, the oil seed material is selected from the group consisting of a soy flake, a soy flour, a soy meal, and combinations thereof. In some embodiments, the soy flake, the soy flour, or the soy meal is defatted. In some embodiments, the oil seed material is a partially-processed oil seed concentrate.

The steeping media can be selected from various materials. In some embodiments, the steeping media is water. In some embodiments, the steeping media comprises a soluble protein. In some embodiments, the steeping media is a wet mill aqueous stream, a dry mill aqueous stream, or a combination thereof. In some embodiments, the steeping media is selected from the group consisting of a corn steepwater stream, a soy steepwater stream, a wheat steepwater stream, a pulse steepwater stream, and combinations thereof. In some embodiments the steeping media has a solids content of less than about 20% dry solids by weight, less than about 15% dry solids by weight, less than about 10% dry solids by weight, or less than about 5% dry solids by weight. In some embodiments, the steeping media is a recycled wash media from a protein concentrate preparation process.

The wash media can be selected from various materials, including materials also used as the steeping media. In some embodiments, the wash media is water. In some embodiments, the washing media is a wet mill aqueous stream, a dry mill aqueous stream, or a combination thereof. In some embodiments, the wash media is selected from the group consisting of a corn steepwater stream, a soy steepwater stream, a wheat steepwater stream, a pulse steepwater stream, and combinations thereof. In some embodiments, the wash media has a solids content of less than about 20% dry solids by weight, less than about 15% dry solids by weight, less than about 10% dry solids by weight, or less than about 5% dry solids by weight. In some embodiments, the volume of one or more of the washes is about 1:1 with respect to the volume of the steeped solids. The pH of one or more process materials can be adjusted and/or maintained within a desired range. In some embodiments, the pH of the wash media is adjusted prior to at least one of the one or more washes of the isolated protein concentrate. In some embodiments, the pH of the steeping media is adjusted prior to combining with the oil seed material to form a slurry. In some embodiments, the pH of the slurry or steeping media is adjusted to the range of about 3.8 to 4.2. In some embodiments, the pH of the wash media is adjusted to the range of about 3.8 to 4.2. In some embodiments, the pH of the slurry during the steeping step is maintained in the range of about 3.8 to 4.2. In some embodiments, the pH of the slurry, steeping media, or wash media is adjusted with an acid. In some embodiments, the acid is selected from the group consisting of lactic acid, citric acid, formic acid, acetic acid, hydrochloric acid, sulfuric acid, and combinations thereof. In some embodiments, the pH of the slurry, steeping media, or wash media is adjusted with a base. In some embodiments, the base is selected from the group consisting of sodium hydroxide, calcium hydroxide, potassium hydroxide, and combinations thereof.

As described herein, one or more enzymes can optionally be added to reduce or eliminate an anti-nutritional factor. In some embodiments, the one or more enzymes is selected from the group consisting of a glucanse, a xylanase, a cellulase, a hemicellulase, an amylase, an alpha-galactosidase, a hemicellulase, a pectinase, a polygalacturonase, a phytase, and a protease, and combinations thereof. In some embodiments, the method can include a heating step for reducing an anti-nutritional factor.

In some embodiments, the method further comprises grinding the oil seed before or during the combining of the oil seed material and the steeping media. In some embodiments, the ground oil seed has an average particle size of about 50 micron. In some embodiments, the isolation step comprises at least one of filtration, membrane filtration, and centrifugation. In some embodiments, the method further comprises treating the protein concentrate or vegetable protein product with a reducing carbohydrate under suitable conditions to form a ruminant feed product. In some embodiments, the method further comprises preparing an animal feed product by combining the wash media and/or steeping media with one or more feed ingredients. In one such embodiment, the one or more feed ingredients comprises fiber. In one such embodiment, the method further comprises concentrating the wash media and/or steeping media.

In some embodiments, the protein concentrate comprises at least about 60% protein on a dry weight basis, at least about 61% protein on a dry weight basis, at least about 62% protein on a dry weight basis, at least about 63% protein on a dry weight basis, at least about 64% protein on a dry weight basis, at least about 65% protein on a dry weight basis, at least about 70% protein on a dry weight basis, at least about 75% protein on a dry weight basis, or at least about 80% protein on a dry weight basis. In some embodiments, the protein concentrate has a moisture content of less than 15%, a moisture content of less than 10%, or a moisture content of less than 5%.

The protein concentrate can have a lower level of antinutritional factors than the levels found in the oil seed prior to processing according to the method of the present invention. In some embodiments, the protein concentrate has a Trypsin Inhibitor content of less than 6 TIU/mg, less than 3 TIU/mg of Trypsin Inhibitor, or less than 1 TIU/mg. In some embodiments, the protein concentrate has less than 0.2% Stachyose. In some embodiments, the protein concentrate has less than 0.2% Raffinose. In some embodiments, the protein concentrate has less than 2% Phytic Acid, less than 1.5% Phytic Acid, or less than 1% Phytic Acid.

In one aspect, the protein concentrate, comprises: a protein derived from an oil seed and corn protein having less than 0.2% Stachyose, less than 0.2% Raffinose, and less than 2% Phytic Acid. In some embodiments, the protein concentrate has greater than 65% soy protein, or greater than 67% soy protein, dry basis.

In one aspect, the protein concentrate can be incorporated into animal feed products or animal feed diets. In some embodiments, the animal feed product is a vegetable protein product, comprising a protein concentrate as described herein and one or more feed ingredients. In some embodiments, the one or more feed ingredients comprises corn protein concentrate. In some embodiments, the animal feed diet comprises a protein concentrate as described herein or a vegetable protein product as described herein. In some embodiments, the animal feed product or diet is suitable for feeding fish or other aquatic animals.

The elements or aspects of any embodiment of the methods or compositions described above can be applied to any other embodiment, as would be understood by a person skilled in the art.

BRIEF DESCRIPTION OF THE DRAWINGS

The following detailed description of the invention will be better understood when read in conjunction with the appended drawings. It should be understood, however, that the invention is not limited to the precise arrangements and instrumentalities of the embodiments shown in the drawings.

DETAILED DESCRIPTION

Figure 1:
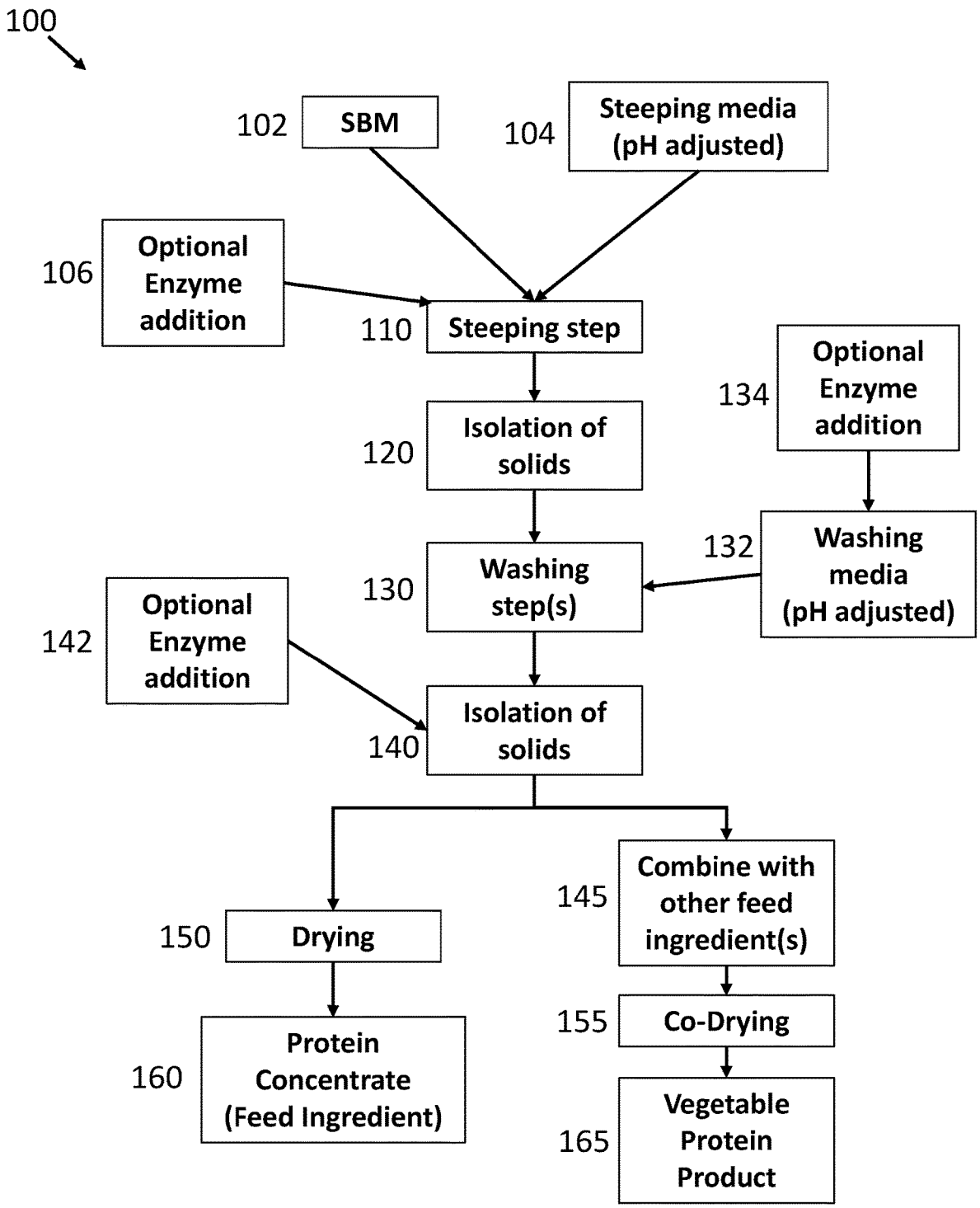
FIG. 1 is a diagram of an exemplary embodiment of a protein concentrate production process or vegetable protein concentrate production process.

It is to be understood that the figures and descriptions of the present invention provided herein have been simplified to illustrate elements that are relevant for a clear understanding of the present invention, while eliminating other elements found in the related field(s) of art. Those of ordinary skill in the art would recognize that other elements or steps may be desirable or required in implementing the present invention. However, because such elements or steps are well known in the art or do not facilitate a better understanding of the present invention, a discussion of such elements or steps is not provided herein.

Unless defined otherwise, all technical and scientific terms used herein have the same meaning as commonly understood by one of ordinary skill in the art to which this invention belongs. As used herein, each of the following terms has the meaning associated with it as defined in this section.

Throughout this disclosure, various aspects of the invention may be presented in a range format. It should be understood that the description in range format is merely for convenience and brevity and should not be construed as an inflexible limitation on the scope of the invention. Accordingly, the description of a range should be considered to have specifically disclosed all the possible subranges as well as individual numerical values within that range. For example, description of a range such as from 1 to 7 should be considered to have specifically disclosed subranges such as from 1 to 3, from 1 to 4, from 1 to 6, from 2 to 5, from 3 to 5, etc., as well as individual numbers within that range, for example, 1, 2, 3, 3.6, 4, 5, 5.8, 6, 7, and any whole and partial increments in between. This applies regardless of the breadth of the range.

Protein Concentrate Production Method

There is a need for protein concentrates derived from sustainable plant sources for use in animal feeds, e.g., nutrient-dense aquaculture feeds. Accordingly, the present disclosure is directed to protein concentrate compositions and methods of preparing such compositions, preferably for use in aquaculture. The disclosed method can be used to make a protein concentrate by combining an aqueous process stream resulting from the milling (wet or dry) of a grain (e.g., corn, wheat, barley, malt, sorghum) or pulse (e.g., pinto bean, kidney bean, navy bean, pea, lentil) with an oil seed (e.g., soybean, canola seed, peanut, sunflower seed, flax seed, cotton seed, rape seed) and/or oil seed meal. The process increases the protein content of the oil seed starting material while also reducing the level of carbohydrate in the resulting protein concentrate. The resulting protein concentrate can have increased digestibility compared to other materials. The protein concentrate can be used as a feed ingredient for feeding fish or other animals.

In one aspect, the protein concentrate is prepared by combining an aqueous process stream including a soluble protein with an oil seed and/or oil seed meal to provide a slurry, isolating a protein concentrate from the slurry, and washing the protein concentrate with an aqueous process stream. Water can be substituted for the aqueous process stream(s) at any point in the process. In one aspect, the process can also include enzymatic treatment. The protein concentrate can be dried or used as a wet cake. In some embodiments, the protein concentrate is co-dried with one or more other feed ingredients to make a feed product. Either the protein concentrate or a feed product including the protein concentrate can be used in an animal feed diet.

In one embodiment, the protein concentrate is prepared by using soybean meal as the oil seed starting material. Processed soybean meal retains much, if not most, of the original soluble sugar content of the raw soybean, which is typically greater than 90 weight percent of the soluble sugar content of the raw soybean. Non-metabolized soluble sugars can exhibit a negative effect on the growth and health of farm-raised fish or other animals. The low energy density of fully defatted soybean meal, due to a high content of non-metabolized soluble sugars and a low level of fat, has limited its inclusion levels in aquaculture diets. An additional detriment in aquaculture is that since the sugars present in soybeans are water-soluble, some of these sugars will dissolve in the water before being consumed by fish and thus contribute pollution to the water.

The protein concentrate produced according to the method of the present invention exhibits improved nutritional content compared to oil seed protein concentrates currently available, specifically by containing lower sugar or starch levels and higher protein levels than such currently available protein concentrates. The method of the present invention can increase the protein levels of the oil seed protein concentrate by steeping an oil seed material with a grain mill stream having soluble protein. While not wishing to be bound by theory, the soluble protein in the grain mill stream may prevent or reduce the dissolution of the oil seed protein during steeping and washing, while allowing some of the sugar or carbohydrate content to dissolve into the aqueous steeping or washing media. Accordingly, some grain protein from the mill stream is incorporated into the oil seed material while at the same time removing carbohydrate via the aqueous steeping and/or washing media.

In some embodiments, the protein concentrate of the present invention can include a different amino acid profile than a typical oil seed amino acid profile or a typical oil seed protein concentrate amino acid profile. For example, a protein concentrate according to the present invention produced from a soy bean material can have a different amino acid profile than the unprocessed soy bean material, or even a soy protein concentrate produced according to other processes, as a result of incorporating proteins from a mill stream that have a different profile of amino acids. In some embodiments, an amino acid supplement can be added to the protein concentrate to change the amino acid profile, for example to address the specific dietary needs of a certain animal. In some embodiments, the source of the mill stream and/or oil seed starting material can be chosen or modified to yield a protein concentrate having the desired amino acid profile.

In one aspect, the process of the present invention exhibits higher protein recovery and solids yield than known processes, which can result in the process providing significantly more value than processes currently used to make vegetable protein concentrates. In some embodiments, the process can exhibit significant protein retention improvement compared to such processes known in the art, for example a protein retention improvement of up to 30% or more.

Referring now to FIG. 1, a diagram of an exemplary process (100) for preparing a protein concentrate, or a vegetable protein product including a protein concentrate, is shown. An oil seed material, for example soybean meal (SBM, 102) and a steeping media (104) are combined to form a steeping slurry and a steeping step (110) is performed. The steeping media is preferably an aqueous process stream having a different protein and amino acid profile than the oil seed meal. In some embodiments, the steeping media includes one or more aqueous byproduct process streams from a corn milling process, for example, light steep water (LSW), gluten mill water (GMW), and/or corn gluten filtrate, but the steeping media can be any suitable aqueous vegetable media. The steeping media has a protein content, preferably primarily water-soluble proteins, for example in the range of about 30-50%. In one embodiment, the steeping media can be water. The pH of steeping media (104) is preferably adjusted prior to steeping step 110. In some embodiments, the pH of the steeping slurry is adjusted after the steeping slurry is formed. In some embodiments, the pH of the steeping media and/or steeping slurry is adjusted to within a range of about 3.8 to 4.2. In some embodiments, the pH is adjusted to within about ±0.2 of 3.8, 4.5, 5.2, 7.5, 8.6, or 10.0. However, the pH can be adjusted to any value as would be understood by a person skilled in the art, and is not limited to any specific value recited herein. In some embodiments, the pH is also maintained in the specified range after adjustment. An optional enzyme addition (106) can be performed before or during steeping step 110.

Steeping step 110 is performed for a predetermined amount of time within a predetermined temperature range. Suitable temperature ranges include about 20 to 30° C., 25 to 35° C., 30 to 40° C., 35 to 45° C., 40 to 50° C., 55 to 65° C., 60 to 70° C., 65 to 75° C., 70 to 80° C., or 75 to 85° C. However, the steeping temperature can be any temperature, as would be understood by a person skilled in the art. Similarly, any suitable steeping time can be used. Non-limiting exemplary steeping times include 0.5 h, 1 h, 8 h, 12 h, or 24 h. In some embodiments, the slurry in steeping step 110 can have less than about 30% dry (total) solids. In some embodiments, the slurry can comprise about 1% to about 30% dry solids, about 5% to about 25% dry solids, about 10% to about 20% dry solids, about 10 to 15% dry solids, or about 15 to 20% dry solids.

Following a suitable duration of steeping time, solids are isolated from the steeping media (120), resulting in a protein concentrate wet cake. In some embodiments, the solids from the steeping slurry are isolated via filtration, for example using a centrifuge, membrane filter, or any other suitable equipment. The isolated solids are then washed one or more times (130) with a washing media (132). It is contemplated herein that the washing step further increases protein content and/or decreases the carbohydrate content of the isolated solids.

Washing step(s) (130) can be performed using any technique. In one embodiment, the washing media is combined with the isolated solids, the resulting slurry is then mixed, and then the washed solids are again isolated, for example by filtration via centrifuge. In another embodiment, the washing media can be applied to the isolated solids within the isolation equipment. In one such embodiment, the wash media can be applied via countercurrent flow. Accordingly, in some embodiments, the isolated solids do not need to be re-slurried in the washing media. In one embodiment, the pH of the washing media can be adjusted prior to use in the washing step(s) (130). In one embodiment, more than one washing step can be performed. In one embodiment, no washing step is performed and the wet isolated solids from step 120 are dried, or co-dried with other ingredients, without being washed. Any suitable wash volume can be used. Non-limiting examples of wash volume ratios include 4:1, 3:1, 2:1, 1:1, 1:2, 1:3, or 1:4 volume of wash to volume of solids. Further, any number of washing steps can be performed, for example 1, 2, 3, 4, or 5 or more washing steps.

Washing media 132 can be the same type of process stream and/or from the same source as steeping media 104. In some embodiments, washing media 132 can be a different type of process stream or from a different source than steeping media 104. In some embodiments, the washing media can be water. In embodiments with multiple washing steps, the composition of the washing media can be different in the washing steps, for example, the steeping media can be used for washing in the first wash, followed by water in subsequent washing steps. The pH of washing media 132 is preferably adjusted prior to washing the solids. Enzymes can also be optionally added to the washing media prior to washing (134).

The spent washing media and/or steeping media, i.e., the liquid media recovered after isolating the solids in steps 120, 130, and/or 140, can be recycled for use in the process. In some embodiments, the spent washing media can be used for the steeping media of another batch for producing the protein concentrate described herein. In such an embodiment, the re-use of washing media as a steeping media can result in significant cost savings, for example by reducing the water usage associated with producing the protein concentrate. In some embodiments, recovered spent washing media and/or steeping media can be used for purposes other than the protein concentrate production process. For example, recovered spent washing media and/or steeping media can be used as a fermentation media, for example in the production of ethanol or other fermentation products. In some embodiments, spent washing media and/or steeping media can be used as a raw material for producing an animal feed ingredient or animal feed product. For example, the washing or steeping media can be combined with fiber, a vegetable protein, and/or other ingredients to create a feed ingredient. In some embodiments, the spent washing media and/or steeping media is concentrated for use in the feed ingredient or product.

Following the one or more washing steps (130), the solids are again isolated and/or de-liquored (140). The isolated solids can optionally be treated with an enzyme (142). In one embodiment, the isolated solids are dried (150) to form a protein concentrate (160), which can be used as a feed ingredient in an animal feed diet. In another embodiment, the isolated solids can be combined with one or more other ingredients (145), then co-dried (155), to form a vegetable protein product (165), also referred to herein as a Plant Protein Concentrate (PPC). Ingredients suitable for co-drying in step 145 can include corn protein concentrates, such as Empyreal® 75 corn protein concentrate, corn gluten meal (CGM), a meal made from pulse, or any other suitable vegetable protein concentrate or other type of feed ingredient. Vegetable protein product 165 can be included in an animal feed diet with other components, such as fats or vitamins. In some embodiments, the PPC is formed from a combination of a corn protein concentrate (CPC) and a soy protein concentrate (SPC), which beneficially yields a material with higher lysine and methionine than other protein concentrate materials. In some embodiments, the ratio of SPC to CPC in the PPC is about 1:2, i.e., one third SPC and two thirds CPC by weight. In other embodiments, the PPC can be, on a dry weight basis, about 10% SPC, 20% SPC, 30% SPC, 40% SPC, 50% SPC, 60% SPC, 70% SPC, 75% SPC, 80% SPC or 90% SPC and the balance CPC.

Any suitable drying method or equipment can be used in drying steps 150 or 155, as would be understood by a person skilled in the art. In some embodiments, the protein concentrate is at least 60%, at least 65%, at least 70%, at least 75%, or at least 80% protein on a dry weight basis. In some embodiments the protein concentrate is dried to less than 15%, less than 10%, or less than 5% moisture. In one embodiment, the protein concentrate is at least 65% protein and 90-95% dry solids. In some embodiments, the protein concentrate can be formed into a desirable shape, such as, for example, a disk, a cube, or a pellet.

In some embodiments, process 100 can also include one or more steps for reducing or eliminating one or more anti-nutritional factors. For example, process 100 can include one or more enzyme treatment steps e.g., steps 106, 134, and/or 142 in FIG. 1. In a preferred embodiment, process 100 includes a phytase treatment of steeping media 104 when steeping media 104 is derived from corn. As would be understood by a person skilled in the art, phytase treatments are often used in the processing of corn mill streams. Therefore, a phytase treatment can be avoided in process 100 if a phytase treatment has already been performed on steeping media 104 as part of another process that produced steeping media 104.

An enzyme treatment step can be performed at any suitable point in process 100, and enzyme treatments are not limited to any specific embodiment recited herein. Addition of an enzyme can result in enzymatic reduction of fibers, carbohydrates, or anti-nutritional factors in the slurry so as to facilitate their removal or elimination. Anti-nutritional factors that can be reduced or eliminated in process 100 can include, but are not limited to, trypsin inhibitor, phytic acid, glycinin antigen, and oligosaccharides (e.g., stacchiose, raffinose, mannans) In one embodiment, the enzyme treatment can include adding one or more of the following enzymes: a phytase, a protease, a glucanase, an alpha-galactosidase, a polygalacturonase, an amylase (e.g., alpha-amylases and gluco-amlyases), a mannanase, a xylanase, a pectinase, a cellulase, or a hemicellulase, however, the one or more enzymes used is not limited to the enzymes listed herein, and can be any suitable enzyme, as would be understood by a person skilled in the art.

In some embodiments, process 100 can also include one or more heating steps for reducing or eliminating one or more anti-nutritional factors. For example, it is known in the art that heating can be useful for reducing the level of Trypsin Inhibitor. Such a heating step can include heating a process stream at any point in the process to a suitable temperature, for example but not limited to: greater than 60° C., 70° C., 80° C., 90° C., 100° C., 110° C., 120° C., 130° C., or 140° C. The process stream can be maintained at such a temperature for a predetermined time suitable for reducing the anti-nutritional factor content to the desired level.

In some embodiments, the process can include other steps. In one embodiment, the process can include one or more steps related to further processing the protein concentrate for use as a ruminant feed. For example, the process of the present invention can include steps to treat the protein concentrate with a reducing carbohydrate to protect the protein concentrate from microbial degradation in the rumen of an animal. Exemplary steps and conditions for such a process are described by Klopfenstein et al. in U.S. Pat. No. 5,064,665, which is hereby incorporated by reference in its entirety.

Steeping Media

Aqueous process streams for use as a steeping media or washing media can be obtained as a product of wet milling and/or dry milling processes, for example fermentation processes. In one embodiment, the aqueous process stream useful for the present invention is any stream, including a byproduct stream, from a wet or dry milling process, such as but not limited to the wet or dry milling streams described herein. Dry milling fermentation and wet milling processes are known in the art and are described, for example, in Watson & Ramstad, ed. (1987, Corn: Chemistry and Technology, Ch. 12 and 19, American Association of Cereal Chemist, Inc., St. Paul, Minn., the disclosure of which is hereby incorporated by reference in its entirety). In some embodiments, the aqueous process stream may result from milling of a grain, such as, for example, corn, wheat, barley, malt, sorghum, or a combination thereof. In some embodiments, the aqueous process stream may result from milling of a pulse, such as, for example, a pinto bean, a kidney bean, a navy bean, a pea, a lentil, or a combination thereof. In some embodiments, the aqueous process stream can be a combination of a stream resulting from milling both grain and pulse. As previously described, in some embodiments, the aqueous process stream can be a stream recovered from any aqueous stream in the process described herein, for example the process shown in FIG. 1.

Wet Milling

Wet milling of a grain or a pulse typically involves soaking or "steeping" the grain or the pulse in water, using processes known to those of ordinary skill in the relevant arts. Commonly, steeping times will range from about 24 to about 48 hours at temperatures of from about 45° C. to about 60° C. In some wet milling processes, for example, wet milling processes involving corn, it may be desirable for the steeping water to include additives, such as, for example, sulfur dioxide (e.g., from about 0.05% to about 0.3% (w/v)) and lactic acid (e.g., 0 to about 0.5% (v/v)).

After steeping, the steeped grain or pulse solids typically are ground and solid fractions are separated from the liquid phase by techniques known in the art, such as by, for example, screen separation, membrane separation, centrifugation, filtration, flotation, and the like, to provide an aqueous process stream, also referred to herein as a "steepwater stream." The steepwater stream can be used as a steeping media in the process of the present invention. The steepwater stream commonly includes soluble components, such as, for example, proteins, carbohydrates, and inorganics. In some embodiments, the steepwater stream can have a solids content of less than about 20% dry solids by weight. In some embodiments, the steepwater stream may have a solids content of about 1.5% to 15% dry solids by weight, about 2% to 15% dry solids by weight, about 8 to 15% dry solids by weight, about 10 to 15% dry solids by weight, or about 1 to 4% dry solids by weight. In some embodiments, the steepwater stream can be a corn steepwater stream, a wheat steepwater stream, a pulse steepwater stream, and combinations thereof. In some embodiments, steepwater stream solids from a corn wet mill typically have 35-45% protein, with the remainder being primarily carbohydrates, organic acids, and inorganics. In some embodiments, the steepwater stream can include sulfur dioxide which can impact protein solubilization.

Dry Milling

Dry milling of grain or pulse typically involves grinding the entire grain or pulse using a mill, for example, a hammer or roller mill, into a flour dry mixture of particles, commonly referred to as "meal." The meal is slurried with water and enzymes are added to the mash to break up starch into smaller fragments and then subject smaller fragments to a saccharification process wherein the starch is converted to sugar.

After the saccharification step, resulting sugars are typically fermented with yeast to facilitate their conversion to ethanol. The mixture is then transferred to distillation columns, where the ethanol is removed from the stillage and further distillers grains are separated to provide a distillers solubles stream. This distillers solubles stream commonly includes soluble components, such as, for example, proteins, carbohydrates, and inorganics. In some embodiments, a distiller's dried grains with solubles (DDGS) is obtained.

In some embodiments, the distillers solubles stream may have a solids content of less than about 20% dry solids by weight. In some embodiments, the distillers solubles stream may have a solids content of about 1.5% to 15% dry solids by weight, about 2% to 15% dry solids by weight, about 10 to 15% dry solids by weight, or about 1 to 4% dry solids by weight. In some embodiments, the distillers solubles stream may be a corn distillers solubles stream, and combinations thereof. Distillers solubles streams from corn dry milling fermentation processes typically have 30% protein, and the rest is typically carbohydrates, fiber, fats, and inorganics.

Oil Seed Materials

The oil seed material useful for process 100 can be in any suitable form. Non-limiting examples include grits, flakes, flour, or meal. In some embodiments, the oil seed used for the oil seed material can be, for example, a soybean, a canola seed, a peanut, a sunflower seed, a flax seed, a cotton seed, a rape seed, or combinations thereof. In some embodiments, preparing the oil seed material from the oil seed can include dehulling or removal of husks or flaking, the removal of at least part of the fat or oil content, and/or milling, or grinding. In a preferred embodiment, the oil seed materials are soy flakes, soy flour and soy meal, especially defatted soy flakes, defatted soy flour and defatted soy meal. In one embodiment, the defatted soy flour contains about 50% of protein and less than 1.2% fat, on a dry-weight basis. In some embodiments, the oil seed material can be a partially-processed oil seed material, e.g., a partially-processed oil seed concentrate retrieved from an intermediate process stream. In such embodiments, the oil seed material is preferably from an intermediate process stream downstream of the oil extraction, i.e., after the oil is substantially removed from the oil seed. For example, such an intermediate process stream can be obtained after the desolventizer toaster (DT) is used in a soybean process. However, the oil seed material is not limited to a specific material described herein, and can include any oil seed-derived material.

Protein Concentrate Feed Ingredients

In some embodiments, the present invention relates to a protein concentrate produced by the methods described herein. The protein concentrates described herein contain an amino acid profile suitable for feeding animals. As previously described, the protein concentrate can include at least 60%, at least 65%, at least 70%, at least 75%, or at least 80% protein on a dry weight basis, and less than 15%, less than 10%, or less than 5% moisture. In one embodiment, the protein concentrate includes a combination of soy protein from a soy bean meal or other soy source, and corn protein from a corn milling stream. The protein concentrate can be used as a feed ingredient or incorporated into an animal feed product for use in an animal feed diet.

In one aspect, the protein concentrate has improved color characteristics compared to other vegetable protein feed materials. In some embodiments, the protein concentrate has an L* value of at least 67, 68, 69, 70, 71, or 72, as measured according to the method described herein. In some embodiments, the protein concentrate has an a* value of less than 10, less than 8, less than 6, less than 5, or less than 4, as measured according to the method described herein. In some embodiments, the protein concentrate has a b* value of less than 30, less than 25, or less than 20, as measured according to the method described herein. Accordingly, in some embodiments the protein concentrate is whiter than other soy protein materials. In some embodiments, the protein concentrate has a less yellow color and/or a less red color than other soy protein materials. The improved color characteristics of the protein concentrate result in a more desirable product than other soy protein feed materials.

Vegetable Protein Products

In some embodiments, the present invention relates to a vegetable protein product that includes a protein concentrate produced by the methods described herein. As previously described, the vegetable protein product can be produced by co-drying a wet protein concentrate with one or more other feed ingredients. The one or more other feed ingredients can include a corn protein concentrate or any other material suitable as a feed ingredient, such as fats or vitamins. As contemplated herein, the vegetable protein product is a homogenous combination of the protein concentrate of the present invention and the one or more other feed ingredients. The homogeneity of the vegetable protein product can ensure consistent delivery of the feed ingredients to the animal. In some embodiments, the vegetable protein product can include a protein concentrate treated with a reducing carbohydrate for use as a feed product useful for feeding a ruminant.

Animal Feed Diet

In some embodiments, the protein concentrates or vegetable protein products produced according to the methods described herein are incorporated into an animal feed diet. The animal feed diet preferably includes most or all of the dietary materials needed by an animal to maintain its health. In some embodiments, the feed diet can include 5%, 10%, 15%, 20%, 25%, 30%, or 35% SPC made according to an embodiment of the present invention. In some embodiments, the feed diet can be 5%, 10%, 15%, 20%, 25%, 30%, or 35% PPC made according to an embodiment of the present invention.

The term "animal" as used in this disclosure includes, for example, bovine, porcine, equine, caprine, ovine, avian animals, seafood (aquaculture) animals, etc. Bovine animals include, but are not limited to, buffalo, bison, and all cattle, including steers, heifers, cows, and bulls. Porcine animals include, but are not limited to, feeder pigs and breeding pigs, including sows, gilts, barrows, and boars. Equine animals include, but are not limited to, horses. Caprine animals include, but are not limited to, goats, including does, bucks, wethers, and kids. Ovine animals include, but are not limited to, sheep, including ewes, rams, wethers, and lambs. Avian animals include, but are not limited to, birds, including chickens, turkeys, and ostriches (and also include domesticated birds also referred to as poultry). Seafood animals (including from salt water and freshwater sources) include, but are not limited to, fish (e.g., salmon, trout, bass, tilapia, and other farmed fish) and shellfish (e.g., clams, scallops, shrimp, crabs, and lobster). In a preferred embodiment, the protein concentrate, vegetable protein product, or animal feed diet described herein are used for aquaculture.

The term "animals" as used in this disclosure also include ruminant and monogastric animals. As used in this disclosure, the term "ruminant" means any mammal that digests plant-based ingredients using a regurgitating method associated with the mammal's first stomach or rumen. Such ruminant mammals include, but are not limited to, cattle, goats, sheep, giraffes, bison, yaks, water buffalo, deer, camels, alpacas, llamas, wildebeest, antelopes and pronghorns. The term "animals" as used in this disclosure also includes domesticated animals (e.g., dogs, cats, rabbits), and wildlife (e.g., deer). However, the methods described herein for preparing a protein concentrate, and the resulting feed ingredient or feed product compositions, are not limited to use for feeding the specific animals recited herein, and can be used for feeding any animal, as would be understood by a person skilled in the art.

Improved Digestibility

In one aspect, the protein concentrate of the present invention (also referred to herein as Plant Protein Concentrate or PPC) exhibits improved digestibility compared to fishmeal or other protein concentrates. In some embodiments, the protein concentrate exhibits higher amino acid digestibility compared to fishmeal or other protein concentrates. In some embodiments, the protein concentrate has a significant number of specific amino acids with a percent digestibility of 90% or greater, as calculated according to the methods described in the experimental examples below. In some embodiments, the total amino acid digestibility of the protein concentrate, i.e., the sum of all amino acids, is at least 90%. In some embodiments, the percent digestibility of 2 or more amino acids is at least 90%. In some embodiments, the percent digestibility of 2 or more amino acids is at least 92%. In some embodiments, the percent digestibility of 2 or more amino acids is at least 94%. In some embodiments, the percent digestibility of 2 or more amino acids is at least 95%. In some embodiments, the percent digestibility of 2 or more amino acids is at least 97%.

In some embodiments, the percent digestibility of 16 or more amino acids is at least 90%. In some embodiments, the percent digestibility of 14 or more amino acids is at least 94%. In some embodiments, the percent digestibility of 10 or more amino acids is at least 94%. In some embodiments, the percent digestibility of 6 or more amino acids is at least 95%.

In some embodiments, the percent digestibility of at least 8, 9, 10, 11, 12, 13, 14, 15, 16, or more amino acids is significantly higher for the protein concentrate compared to Menaheden Fishmeal. In some embodiments, the percent digestibility of at least 2, 3, 4, 5, 6, 7, 8, 9, 10, 11, 12, 13, 14, 15, 16, or more amino acids is significantly higher for the protein concentrate compared to a corn protein concentrate. In some embodiments, the percent digestibility of at least 2, 3, 4, 5, 6, 7, 8, 9, 10, 11, 12, 13, 14, 15, 16, or more amino acids is significantly higher for the protein concentrate compared to a pet food grade poultry by-product meal.

The amino acids corresponding to the percent digestibility referred to above include alanine (ALA), arginine (ARG), aspartic acid (ASP), cysteine (CYS), glutamic acid (GLU), glycine (GLY), histidine (HIS), isoleucine (ILE), leucine (LEU), lysine (LYS), methionine (MET), phenylalanine (PHE), proline (PRO), serine (SER), threonine (THR), tyrosine (TYR), and valine (VAL). See also FIGS. 2, 3, and 4 for amino acid content on dry matter basis and digestibility of amino acids for an exemplary embodiment of a protein concentrate produced according to the method of the present invention.

EXPERIMENTAL EXAMPLES

The invention is further described in detail by reference to the following experimental examples. These examples are provided for purposes of illustration only, and are not intended to be limiting unless otherwise specified. Thus, the invention should in no way be construed as being limited to the following examples, but rather should be construed to encompass any and all variations which become evident as a result of the teaching provided herein.

Example 1: Production of a Soy Protein Concentrate

Described herein is an example of a process for producing a protein concentrate, specifically, a soy protein concentrate (SPC), using water, light steep water, corn gluten mill water, corn gluten filtrate, modified corn gluten filtrate, or a combination of water, light steep water, and corn gluten mill water to remove soluble carbohydrates and raise protein concentration in soy bean meal.

Exemplary process steps are shown in FIG. 1. Suitable conditions for the processing of the soybean meal (SBM) and diluent are outlined in Table 1. Resulting dry product protein concentrations are measured using standard procedures, such as ASTM 16634 (total Nitrogen/Protein of food products, oilseeds, and animal feeds) using a LECO TruMac Nitrogen Analyzer (LECO Corporation, St. Joseph, Mich.).

For each case, SBM (e.g., 11.6 g to 2000 g, 48% protein; 53.2% protein on a dry basis) is mixed at a proportion of 10% wt/wt with different steeping media: tap water, light steep water (LSW), corn gluten mill water (GMW), corn gluten filtrate, or modified corn gluten filtrate. Soy flakes can also be used as starting material. SBM is made from soy white flakes by desolventizing and toasting the soy white flakes.

The pH and temperature of steeping media was adjusted as required. The pH is adjusted using either lactic acid, sulfuric acid, or sodium hydroxide. However, other acids and bases can be used. Non-limiting examples of other acids bases include: organic acids such as formic acid, citric acid, or acetic acid; inorganic acids such as hydrochloric acid; and bases such as calcium hydroxide or potassium hydroxide.

SBM is steeped with continuous agitation for different time lengths and at different temperatures. Solids are separated by centrifuging. Additional washes and solid separation steps (4 rounds) are performed using wash liquid at 1:1 or 1:4 v/v of dewatered solids. Where applicable, enzymes are added to wet solids and held for 1-2 hrs before drying for ANF reduction. Wet (dewatered) solids are dried. Moisture and protein of each fraction was measured using standard methods. Mass and protein balance was performed to calculate mass and protein yields.

Results for a variety of different processes are shown in Table 2. The highest protein content is generally observed in processes that included washes and processes with a lower pH during steeping. Notably, processes run with SBM as is, at pH 3.8, in GMW steeping media, and washed with water or GMW have high protein concentrations. These processes are comparable in protein concentration to a process run with ground SBM and water as a steeping media. Experiment nos. 1.13 and 1.15 represent processes currently known in the art (see, e.g., Jhanjan et al., EP Pat. No. 0925723, which is hereby incorporated by reference in its entirety). The process of the present invention can exhibit a protein retention improvement of up to 30% compared to such processes known in the art.

TABLE 1

Summary of Potential Process Conditions

| | |
|---|---|
| SBM | As is or ground to 50 micron |
| Steeping media | Water, LSW, GMW, combination of (water, LSW and GMW), corn gluten filtrate and modified corn gluten filtrate |
| (10% w/w slurry) | |
| Washing media | none, Water, LSW, GMW, combination of (water, LSW and GMW) |
| pH | 3.8-10.0 |
| Temperature | 30-80° C. |
| Incubation time | 0.5-24 hrs |
| # of wash steps | none-4 |
| Wash liquid volume | 1:1-1:4 v/v of solids |
| Acid | Lactic acid and sulfuric acid |
| Base | Sodium hydroxide |
| Main enzyme activity | Phytase (steeping and wash media); cellulase, hemicellulase, xylanase, pectinase (steeping and wash media); Protease (steeping and wash media, and dewatered wet solids) |
| Solid Separation | decanter centrifuge, screen bowl centrifuge, screen separation, cloth membrane filtration |
| Drying | tray drying, fluidized bed drying, flash drying, tunnel drying, drum drying |

TABLE 2

Results

| Ex. # | SBM | Steeping media | Washing media | pH | Temp. C. | Incubation time (hr) | # of wash steps | Wash vol. (v/v) | SPC protein % dry basis | Solid yield % |
|---|---|---|---|---|---|---|---|---|---|---|
| 1.1 | As is | water | N/A | 4.0 | 50 | 0.5 | N/A | N/A | 61.46 | 78.0 |
| 1.2 | As is | water/CSL (50:50) | N/A | 4.0 | 50 | 0.5 | N/A | N/A | 59.47 | 85.5 |
| 1.3 | As is | CSL | N/A | 4.0 | 50 | 0.5 | N/A | N/A | 55.27 | 103.5 |
| 1.4 | As is | water | N/A | 4.0 | 50 | 24 | N/A | N/A | 61.94 | 77.0 |
| 1.5 | As is | Corn Gluten Filtrate | N/A | 5.2 | 50 | 0.5 | N/A | N/A | 57.96 | 81.0 |
| 1.6 | As is | Modified Corn Gluten Filtrate | N/A | 5.3 | 50 | 0.5 | N/A | N/A | 56.14 | 92.5 |

TABLE 2-continued

Results

| Ex. # | SBM | Steeping media | Washing media | pH | Temp. C. | Incubation time (hr) | # of wash steps | Wash vol. (v/v) | SPC protein % dry basis | Solid yield % |
|---|---|---|---|---|---|---|---|---|---|---|
| 1.7 | As is | water | N/A | 4.5 | 50 | 0.5 | N/A | N/A | 63.21 | 79.0 |
| 1.8 | As is | water | N/A | 8.6 | 50 | 0.5 | N/A | N/A | 61.85 | 78.5 |
| 1.9 | As is | water | N/A | 10.0 | 50 | 0.5 | N/A | N/A | 61.56 | 77.5 |
| 1.10 | Ground | GMW | N/A | 3.8 | 80 | 16 | N/A | N/A | 67.05 | 77.4 |
| 1.11 | Ground | water | water | 5.2 | 50 | 16 | 1 | 1:1 | 64.6 | 71.6 |
| 1.12 | Ground | water | water | 5.2 | 50 | 0.5 | 1 | 1:1 | 50.74 | 97.9 |
| 1.13 | As is | water | water | 3.8 | 50 | 0.5 | 4 | 1:4 | 61.00 | 57.2 |
| 1.14 | As is | GMW | GMW | 3.8 | 50 | 0.5 | 4 | 1:4 | 65.70 | 68.4 |
| 1.15 | As is | water | water | 3.8 | 50 | 0.5 | 2 | 1:1 | 63.40 | 56.9 |
| 1.16 | As is | GMW | GMW | 3.8 | 50 | 0.5 | 2 | 1:4 | 67.80 | 82.6 |
| 1.17 | As is | CSL | CSL | 3.8 | 50 | 0.5 | 2 | 1:1 | 57.19 | 99.0 |
| 1.18 | As is | CSL/water (50:50) | CSL/water (50:50) | 3.8 | 50 | 0.5 | 2 | 1:1 | 63.02 | 83.3 |
| 1.19 | As is | CSL/water (25:75) | CSL/water (25:75) | 3.8 | 50 | 0.5 | 2 | 1:1 | 65.84 | 77.5 |
| 1.20 | As is | CSL/water/GMW (25:50:25) | CSL/water/GMW (25:50:25) | 3.8 | 50 | 0.5 | 2 | 1:1 | 65.40 | 79.0 |
| 1.21 | As is | GMW | GMW | 3.8 | 50 | 0.5 | 2 | 1:1 | 65.03 | 78.6 |
| 1.22 | As is | CSL/water (25:75) | CSL/water (25:75) | 3.8 | 50 | 0.5 | 2 | 1:1 | 65.46 | 77.0 |
| 1.23 | As is | CSL/water/GMW (33:34:33) | CSL/water/GMW (33:34:33) | 3.8 | 50 | 0.5 | 2 | 1:1 | 63.05 | 72.6 |

Calculation of Solid Yield %
The solid yield is calculated as follows:

Solid yield %=(SPC solid kg at end of process/SBM solid kg input to process)*100

For Experiment 1.22: Solid yield %=(0.138/0.179) *100=77%

Example 2: Reduction of Anti-Nutritional Factors (ANFs) in SBM

Described herein are examples of the production of a soy protein concentrate product using different process conditions for the purpose of reducing ANFs.

A summary of ANF analysis on the resulting soy protein concentrates is shown in Table 3. Processes are performed as in Example 1, except as otherwise indicated or described. No enzymes are added in experiments 2.1, 2.2, 2.3, 2.4 and 2.5. For experiments 2.6, 2.7, 2.8, and 2.9: a phytase is used in the steeping step and a protease is dosed to the dewatered cake and held for two hours before drying.

TABLE 3

ANF analysis for selected experiments*

| Exp. # | Wash composition | Trypsin Inhibitor (TIU/mg)** | Phytic Acid (%) | Stachyose % | Raffinose % |
|---|---|---|---|---|---|
| N/A | SBM starting material | 6.35 | 1.48 | 4.76 | 1.05 |
| 2.1 | W-W 1:1 | 4.29 | 0.87 | <0.2 | <0.2 |
| 2.2 | W-GMW 1:1 | 2.94 | 1.37 | <0.2 | <0.2 |
| 2.3 | GMW-W 1:4 | 5.83 | 1.11 | <0.2 | <0.2 |
| 2.4 | GMW-GMW 1:4 | 3.48 | 2.52 | <0.2 | <0.2 |
| 2.5 | GMW-GMW 1:1 | 5.43 | 1.99 | <0.2 | <0.2 |
| 2.6 | GMW-GMW 1:1 | <1.0 | 0.92 | <0.2 | <0.2 |
| 2.7 | GMW-GMW 1:1 | 5.72 | 1.00 | <0.2 | <0.2 |
| 2.8 | GMW-GMW 1:1 | 1.49 | 0.99 | <0.2 | <0.2 |
| 2.9 | GMW-GMW 1:1 | 3.18 | 1.02 | <0.2 | <0.2 |

*ANF analysis performed by Nestle Purina Analytical Laboratories using the following methods: Phytic acid: Analytical Biochemistry Vol 77: 536-539 (1977); Trypsin Inhibitor: AOCS Ba 12-75; Raffinose and Stachyose: by LC, J. Am. Oil Chem. Soc. 1980, 143.

**TIU/mg is an activity quantification which can be defined as: one Trypsin Inhibitor Unit (TIU) will decrease the activity of 2 trypsin units by 50%, where 1 trypsin unit will hydrolyze 1.0 μmole of N-α-benzoyl-DL-arginine p-nitroanilide (BAPNA) per minute at pH 7.8 and 25° C.

Example 3: Composition of Soy Protein Concentrate

In Tables 4 and 5, the composition of various materials is provided along with the composition of an exemplary embodiment of a soy protein concentrate (SPC) produced according to an embodiment of the process described in Example 1.

TABLE 4

| General Composition* | | | | | | |
|---|---|---|---|---|---|---|
| | SBM | | | SPC | | |
| | as is | as is | db | as is | as is | db |
| Moisture | 12.5 | 10.0 | | 5.0 | 10.0 | |
| Protein | 46.7 | 48.0 | 53.4 | 63.1 | 59.8 | 66.4 |
| Crude Fat | 1.2 | 1.2 | 1.4 | 1.0 | 0.9 | 1.0 |
| Crude Fiber | 3.6 | 3.7 | 4.1 | 5.2 | 4.9 | 5.5 |
| Ash | 5.4 | 5.6 | 6.2 | 3.9 | 3.7 | 4.1 |
| Carbohydrate (by difference) | 30.6 | 31.5 | 35.0 | 21.9 | 20.7 | 23.0 |

*Analysis done by Eurofins Nutrition Analysis Center according to the following methods:
Moisture    AOCS Ba 2a-38               Forced Draft Oven
Protein     AOAC 992.15; AOAC 990.03; AOCS Combustion
            Ba3e-93
Crude Fat   AOCS Ba3-38                 Petroleum Ether Extraction
Crude Fiber AOAC 962.09 or AOCS Ba 6-84
Ash         AOAC 942.05

TABLE 5

| Amino Acid Profile (dry basis)* | | | | |
|---|---|---|---|---|
| amino acid (g/100 g) | SBM | SPC | LSW | Empyreal CPC |
| Asp | 6.13 | 7.39 | 2.8 | 4.7 |
| Thr | 2.11 | 2.60 | 1.8 | 2.5 |
| Ser | 2.69 | 3.36 | 2 | 3.9 |
| Glx | 10.60 | 12.84 | 7 | 17 |
| Pro | 2.85 | 3.66 | 2.2 | 2 |
| Gly | 2.29 | 2.84 | 3.6 | 6.9 |
| Ala | 2.31 | 2.97 | 2.4 | 3.7 |
| Val | 2.70 | 3.41 | 1 | 1.8 |
| Ile | 2.42 | 3.01 | 1.4 | 3.4 |
| Leu | 4.00 | 5.07 | 4 | 14 |
| Tyr | 1.89 | 2.34 | 1 | 4.4 |
| Phe | 2.77 | 3.43 | 1.6 | 5.2 |
| His | 1.44 | 1.80 | 1.6 | 1.2 |
| Lys | 3.29 | 3.99 | 1.4 | 1.7 |
| Arg | 4.07 | 4.81 | 2.2 | 2.5 |
| Cys | 0.72 | 0.96 | 4 | 7.4 |
| Met | 0.69 | 0.88 | 1.6 | 1.3 |
| Trp | 0.63 | 0.79 | 0.1 | 0.4 |
| Total | 53.59 | 66.12 | 41.70 | 84.00 |

*Analysis done by Nestle Purina Analytical Laboratories according to the following methods: Acid stable amino acids: AOAC 982.30 (modified); Sulfur amino acids (after oxidation): AOAC 994.12 (modified); Tryptophan by alkaline hydrolysis: AOAC 988.15.

Example 4: Composition of Vegetable Protein Products

The composition of exemplary embodiments of a vegetable protein product are shown in Table 6. The vegetable protein products were prepared according to embodiments of the process shown in FIG. 1, wherein the SPC is co-dried with Empyreal® corn protein concentrate (CPC) in varying ratios to form a Plant Protein Concentrate (PPC).

TABLE 6

| Vegetable Protein Product Compositions | | | | | | | |
|---|---|---|---|---|---|---|---|
| amino acid | | | SPC to CPC Ratio Mix | | | | |
| (g/100 g) | SPC | CPC | 10 to 90 | 25 to 75 | 50 to 50 | 75 to 25 | 90 to 10 |
| Asp | 7.4 | 4.7 | 4.97 | 5.37 | 6.04 | 6.71 | 7.12 |
| Thr | 2.6 | 2.5 | 2.51 | 2.52 | 2.55 | 2.57 | 2.59 |

TABLE 6-continued

| Vegetable Protein Product Compositions | | | | | | | |
|---|---|---|---|---|---|---|---|
| amino acid | | | SPC to CPC Ratio Mix | | | | |
| (g/100 g) | SPC | CPC | 10 to 90 | 25 to 75 | 50 to 50 | 75 to 25 | 90 to 10 |
| Ser | 3.4 | 3.9 | 3.85 | 3.76 | 3.63 | 3.49 | 3.41 |
| Glx | 12.8 | 17 | 16.58 | 15.96 | 14.92 | 13.88 | 13.25 |
| Pro | 3.7 | 2 | 2.17 | 2.42 | 2.83 | 3.25 | 3.50 |
| Gly | 2.8 | 6.9 | 6.49 | 5.89 | 4.87 | 3.86 | 3.25 |
| Ala | 3.0 | 3.7 | 3.63 | 3.52 | 3.33 | 3.15 | 3.04 |
| Val | 3.4 | 1.8 | 1.96 | 2.20 | 2.60 | 3.01 | 3.25 |
| Ile | 3.0 | 3.4 | 3.36 | 3.30 | 3.20 | 3.11 | 3.05 |
| Leu | 5.1 | 14 | 13.11 | 11.77 | 9.54 | 7.30 | 5.96 |
| Tyr | 2.3 | 4.4 | 4.19 | 3.88 | 3.37 | 2.85 | 2.54 |
| Phe | 3.4 | 5.2 | 5.02 | 4.76 | 4.32 | 3.87 | 3.61 |
| His | 1.8 | 1.2 | 1.26 | 1.35 | 1.50 | 1.65 | 1.74 |
| Lys | 4.0 | 1.7 | 1.93 | 2.27 | 2.84 | 3.42 | 3.76 |
| Arg | 4.8 | 2.5 | 2.73 | 3.08 | 3.65 | 4.23 | 4.58 |
| Cys | 1.0 | 7.4 | 6.76 | 5.79 | 4.18 | 2.57 | 1.60 |
| Met | 0.9 | 1.3 | 1.26 | 1.19 | 1.09 | 0.98 | 0.92 |
| Trp | 0.8 | 0.4 | 0.44 | 0.50 | 0.60 | 0.69 | 0.75 |
| Protein | 66.1 | 84.0 | 82.21 | 79.53 | 75.06 | 70.59 | 67.91 |

(Analysis performed according to methods recited in previous examples)

Example 5: Composition of Corn Process Streams

Exemplary compositions of corn process streams useful for the process of the present invention are provided in Table 7.

TABLE 7

| Corn Stream Compositions | | | |
|---|---|---|---|
| | GMW g/L | LSW g/L | LSW/H$_2$O 25/75 g/L |
| DP3+ | 2.97 | 14.85 | 3.67 |
| Maltotriose | 0.66 | 2.109 | 0.54 |
| Maltose | 0.97 | 2.781 | 0.58 |
| Dextrose | 4.85 | 12.12 | 3.03 |
| Fructose | 2.87 | 9.78 | 2.49 |
| Citric Acid | 1.14 | 5.17 | 1.37 |
| Succinic Acid | 0.17 | 1.08 | 0.71 |
| Lactate | 4.80 | 28.41 | 10.16 |
| Glycerol | 0.19 | 1.18 | 0.27 |

TABLE 7-continued

Corn Stream Compositions

|  | GMW g/L | LSW g/L | LSW/H$_2$O 25/75 g/L |
|---|---|---|---|
| Acetate | 0.35 | 1.05 | 0.45 |
| Propionic Acid | 0.49 | 1.54 | 0.44 |
| Ethyl Alcohol | 0.32 | 1.07 | 0.28 |
| dry solids % | 4.10 | 15.30 | 4.10 |
| Protein % db | 38.20 | 39.90 | 39.90 |

Methods: Moisture: AOCS Ba 2a-38, Forced Draft Oven; Protein: AOAC 992.15, AOAC 990.03, AOCS Ba3e-93, Combustion; Sugars and organics: HPLC.

Example 6: In Vivo Digestibility of a Protein Concentrate in Rainbow Trout

A soy protein concentrate was manufactured using processing streams from a wet corn mill. The protein concentrate was tested to be 64.8% protein on a dry mass basis (DMb) and was derived from soy bean meal collected from the Sidney, Ohio crush facility. Prototype material was batch made in the SSNA Dayton R&D facility and composited to produce approximately 15 kg of protein concentrate, which was submitted to the USDA-Bozeman Fish Technology Center (BFTC) for testing. The BFTC tested the digestibility of ingredients in rainbow trout and hybrid striped bass. The tested protein concentrate showed greater than 90% amino acid digestibility.

Materials and Methods:

Approximately 15 kg of soy protein concentrate (SPC) prototype was manufactured at the Cargill Starches and Sweeteners R&D Pilot Facility in Dayton, Ohio Nine separate batches (Table 8) were prepared using acidified corn steep liquor as the steep and wash media. All wet SPC cake was processed through a lab scale Retsch TG100 fluidized bed dryer with the airflow set at 100% to achieve a maximum air temperature of 83.8° C. and a maximum product temperature of 172° C. for 8 to 10 minutes. Batches were combined to create the final lot (BBDAYRD10816) with a final protein content of 64.8% on a dry basis. Moisture for the final composite was 6.9%.

Composited material (BBDAYRD010816) was shipped to the USDA—Bozeman Fish Technology Center for in vivo digestibility testing in rainbow trout. The nutritional value of each ingredient was evaluated by determining the apparent digestibility of nutrients, energy, fat, amino acids and select minerals from the ingredient in compounded, extruded diets. Nutrient and energy digestibility is determined using the methods described by Cho et al. (Cho. C. Y., Slinger, S. J., and Bayley, H. S. 1982. Bioenergetics of salmonid fishes: energy intake, expenditure and productivity. Comparative Biochemistry and Physiology 73B: 25-41) and Bureau et al. (Bureau, D. P., A. M. Harris, and Cho, C. Y. 1999. Apparent digestibility of rendered animal protein ingredients for rainbow trout (Oncorhynchus mykiss). Aquaculture 180:345-358) to estimate apparent digestibility coefficients (ADCs). All diets are labeled using yttrium oxide as the inert markers. A complete reference diet (Table 9) for rainbow trout is blended with the test ingredients in a 70:30 ratio (dry-weight basis) to form test diets. This diet has been used successfully in several digestibility and growth trials with rainbow trout (Barrows, F. T., Gaylord, T. G., Sealey, W. M., Porter, L., Smith, C. E. 2008, The effect of vitamin premix in extruded plant based and fish meal based diets on growth efficiency and health of rainbow trout, Oncorhynchus mykiss. Aquaculture, 283, 148-155; Gaylord, T. G., Barrows, F. T., and Rawles, S. D. 2008, Apparent Digestibility of Gross Nutrients from Feedstuffs in Extruded Feeds for Rainbow Trout, Oncorhynchus mykiss, Journal of the World Aquaculture Society. 39:827-834; Gaylord, T. G., Barrows, F. T., Rawles, S. D., Liu, K., Bregitzer, P., Hang, A., Obert, D., and Morris, C. 2009, Apparent digestibility of nutrients in extruded diets from cultivars of barley and wheat selected for nutritional quality in rainbow trout (Oncorhynchus mykiss), Aquaculture Nutrition. 15:306-312; Barrows, F. T., Gaylord, T. G., Sealey, W. M., Porter, L., Smith, C. E. 2009, Supplementation of plant-based diets for rainbow trout, Oncorhynchus mykiss with macro-minerals and inositol, Aquaculture Nutrition, accepted; Gaylord, T. G., Barrows, F. T. and Rawles, S. D., 2010, Apparent Amino Acid Availability from Feedstuffs in Extruded Diets for Rainbow Trout Oncorhynchus mykiss, Aquaculture Nutrition. 16: 654-661).

Apparent digestibility coefficients of each nutrient in the test diet and ingredients is calculated according to the following equations on a dry weight basis (Kleiber, M. 1961, The fire of life: an introduction to animal energetics, John Wiley and Sons, Inc., New York, N.Y., USA; Forster, I., 1999, A note on the method of calculating digestibility coefficients of nutrients provided by single ingredients to feeds of aquatic animals, Aquaculture Nutrition 5:143-145):

$$ADCN_{diet} = 100 - 100 \{\% \ Yt \ \text{in diet} \times \% \ \text{nutrient in feces}\}$$
$$\{\% \ Yt \ \text{in feces} \ \% \ \text{nutrient in diet}\}$$

$$ADCN_{ingredient} = \{(a+b) \ ADCN_t - (a)ADCN_r\}b^{-1}$$

where, $ADCN_{ingredient}$=apparent digestibility coefficient of the nutrient in the test ingredient $ADCN_t$=apparent digestibility coefficients of the nutrient in the test diets $ADCN_r$=apparent digestibility coefficients of the nutrient in the reference diet a=(1−p)×nutrient content of the reference diet b=p×nutrient content of the test ingredient p=proportion of test ingredient in the test diet All diets are manufactured by cooking extrusion (DNDL-44, Buhler AG, Uzwil, Switzerland). General parameters for extrusion were an 18-s exposure to an average of 127° C. in the extruder barrel sections (6). Pressure at the die head can vary from 260 to 450 psi, depending on test diet. Pellets of 3-4 mm are produced and dried in a pulse-bed drier (Buhler AG, Uzwil, Switzerland) to less than 10% moisture, followed by a 20 minute cooling period at ambient temperature. All diets are top-coated with fish oil using a vacuum coater (A.J. Mixing, Ontario, Canada).

In rainbow trout trials, the experimental diets are fed to trout in 330-L tanks. Fish size varies across experiments but generally range between 250 g to 400 g, but can be greater depending on fish availability. Stocking densities vary accordingly from 20 to 30 fish per tank. Water temperature is maintained at 15° C. and lighting is maintained on a 13:11 h diurnal cycle. Each diet is fed to three randomly assigned replicate tanks of fish and fed to satiation by hand twice daily. Fecal samples were obtained by manual stripping, 16-18 h post-feeding for trout. Manual stripping of all fish in each tank was accomplished by netting and anesthetizing the fish, followed by gently drying and then applying pressure to the lower abdominal region to first express urine to a waste container and then fecal matter into a plastic weighing pan. Fecal samples for each tank were dried by freeze-drying and stored at −20° C. until chemical analyses are performed.

Proximate analyses—Moisture content is measured as loss in drying for ingredients, diets and fecal samples and performed according to standard methods (AOAC 1995). Crude protein (N×6.25) is determined in ingredients, diets, and fecal samples by the Dumas method (AOAC 1995) on a Leco TruSpec N nitrogen determinator (LECO Corporation, St. Joseph, Mich., USA). Total energy is determined by isoperibol bomb calorimetry (Parr 6300, Parr Instrument Company Inc., Moline, Ill., USA). All samples are assayed for crude lipid by ether extract for 60 minutes at 95° C. using an Ankom XT10 (Ankom Technologies, Macedon, N.Y., USA) followed by acid hydrolysis at 90° C. for 60 minutes with 5N HCl and a 40 minute rinse time using an Ankom HCL hydrolysis system followed by a second ether extract as previously described Amino acids are quantified on a Biochrom 30+ amino acid analyzer after digestion for 16 h at 110° C. in 6N HCl (AOAC 1995). Mineral analysis is performed for yttrium and other selected minerals by ICP-OES spectroscopy after nitric acid digestion.

TABLE 8

Composition of digestibility reference diet
(% dry-weight) for feeding to rainbow trout

| Ingredients, | % |
|---|---|
| Wheat flour[1] | 28.4 |
| Squid meal | 25.0 |
| Soy protein concentrate[2] | 17.1 |
| Fish oil[3] | 13.4 |
| Corn gluten meal[4] | 8.3 |
| Soybean meal[5] | 4.3 |
| Vitamin premix ARS[6] | 1.0 |
| Chromic oxide[7] | 1.0 |
| Choline chloride[7] | 0.6 |
| Taurine[8] | 0.5 |
| Stay-C 35[9] | 0.2 |
| Trace mineral premix[10] | 0.1 |
| Yttrium oxide[7] | 0.1 |

[1]Archer Daniels Midland (Decatur, IL, USA) 4 g/kg protein.
[2]Solae Profine VP (St. Louis, MO, USA) 693 g/kg crude protein.
[3]Omega Proteins Inc (Houston, TX, USA).
[4]Cargill Animal Nutrition (Minneapolis, MN, USA), 601.0 g/kg protein.
[5]Archer Daniels Midland (Decatur, IL, USA), 480 g/kg protein.
[6]Contributed, per kg diet; vitamin A 9650 IU; vitamin D 6600 IU; vitamin E 132 IU; vitamin K3 1.1 g: thiamin mononitrate 9.1 mg; riboflavin 9.6 mg; pyridoxine hydrochloride 13.7 mg; pantothenate DL-calcium 46.5; cyancobalamin 0.03 mg; nicotinic acid 21.8 mg; biotin 0.34 mg; folic acid 2.5; inositol 600.
[7]Sigma-Aldrich Company (St Louis, MO, USA).
[8]Archer Daniel Midlands (Decatur, IL, USA).
[9]Rovimix Stay-C 35 (DSM).
[10]Contributed in mg/kg of diet; zinc 40; manganese 13; iodine 5; copper 9.

The average weight of the rainbow trout used in this study was 539.6 g (+/−85 g) and 20 fish were stocked into each of three reference tanks. Diets consisted of one of three diets: Reference Diet (Table 8), Reference Diet with 30% of diet replaced with Menaheden Fishmeal (Select) (MFM), or Reference Diet replaced with 30% Cargill SPC Prototype (C-SPC) according to an embodiment of the present invention. The difference between the reference and the added ingredient was used to calculate the available energy and the apparent digestibility coefficient of the added ingredient.

The mean ADCN was calculated across the three tanks for the MFM and the C-SPC diets and compared. Additional comparisons to specific ingredients in the "Database of Nutrient Digestibility's of Traditional and Novel Feed Ingredients for Trout and Hybrid Striped Bass—USDA (Barrows, et. al.) were also made. Ingredient comparisons include: poultry byproduct meal, Empyreal® 75 corn protein concentrate, and 48% CP soybean meal. However, varied biological response in the comparison with the ingredients in Barrows et al. may be attributed to different testing protocols used than the protocol used by the BFTC.

Results

Ingredient nutrient analysis conducted by the BFTC is shown in Table 9. There appeared to be good agreement between the BFTC analysis and SSNA Dayton R&D with 0.01 differences between the two labs.

TABLE 9

Ingredient nutrient analysis

|  | MFM | C-SPC |
|---|---|---|
| Dry mass (DM) (%) | 93.889 | 93.16 |
| Fat % | 10.43 | 3.43 |
| Protein % (DMb) | 68.98 | 64.69 |

Figure 2:
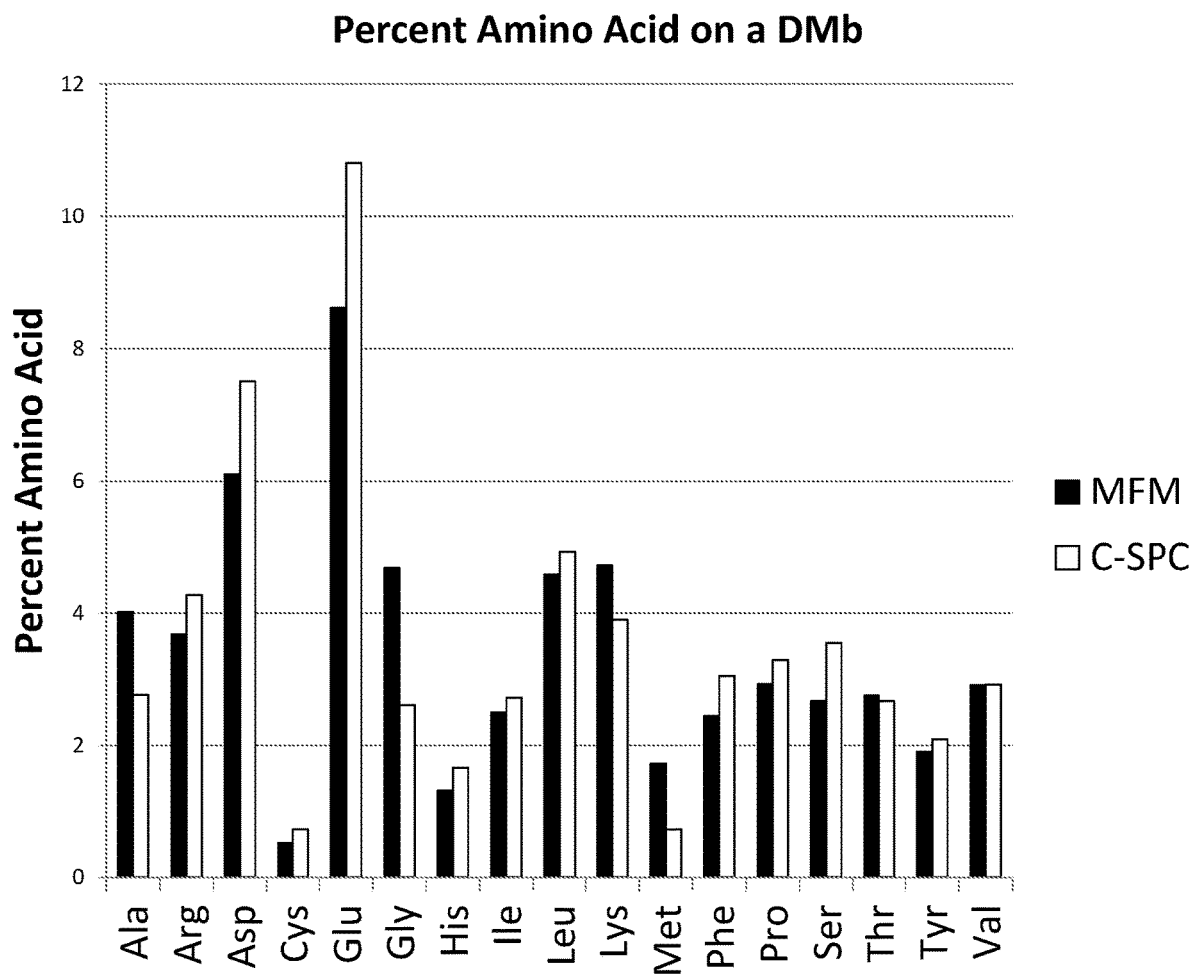
FIG. 2 is a graph showing data from the analysis of amino acid content of Menhaden Fishmeal, Select (MFM, left bars) and a protein concentrate according to one embodiment of the present invention (Cargill Soy Protein Concentrate (C-SPC), right bars) on a dry matter basis.
Figure 3:
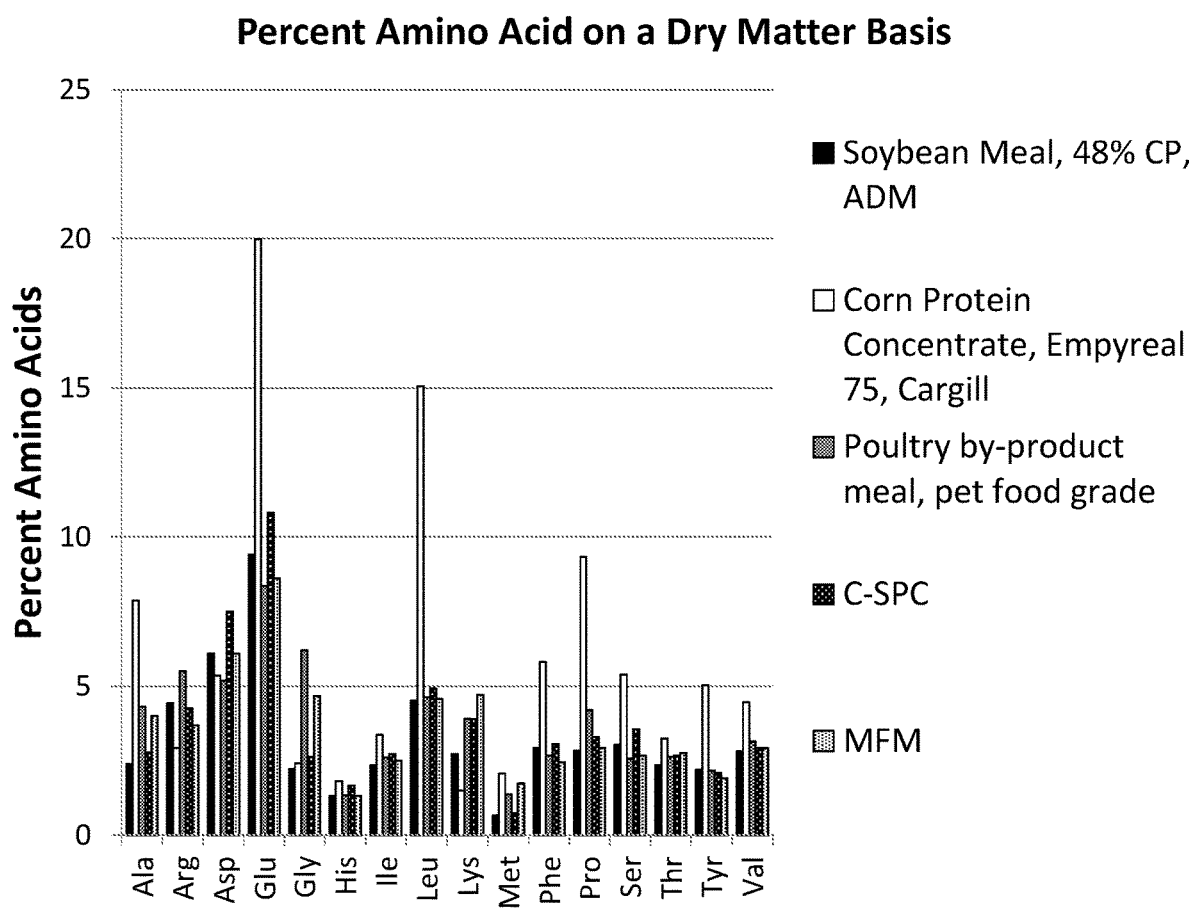
FIG. 3 is a graph showing comparisons of ingredient amino acid content for various feed types, bars from left to right: soybean meal (leftmost bars), corn protein concentrate, poultry by-product (middle bars), C-SPC, and MFM (rightmost bars).

Amino acid content of each ingredient was analysed and reported on a dry matter basis (~93% DM for each ingredient, FIG. 2). Lysine and methionine content were slightly higher for the MFM. For a broader comparison, ingredients in the BFTC were compared to C-SPC and included 48% CP SBM, Empyreal™ 75, and poultry byproduct meal (FIG. 3). In comparison to poultry meal C-SPC demonstrated equivalent levels of lysine, but is lower in methionine. In contrast to Empyreal™ 75, this provides higher levels of methionine than the poultry meal. C-SPC has higher concentrations of all amino acids with the exception of proline and tyrosine when compared to 48% SBM. These exceptions may be a consequence of different sources of soybean meal.

Figure 4:
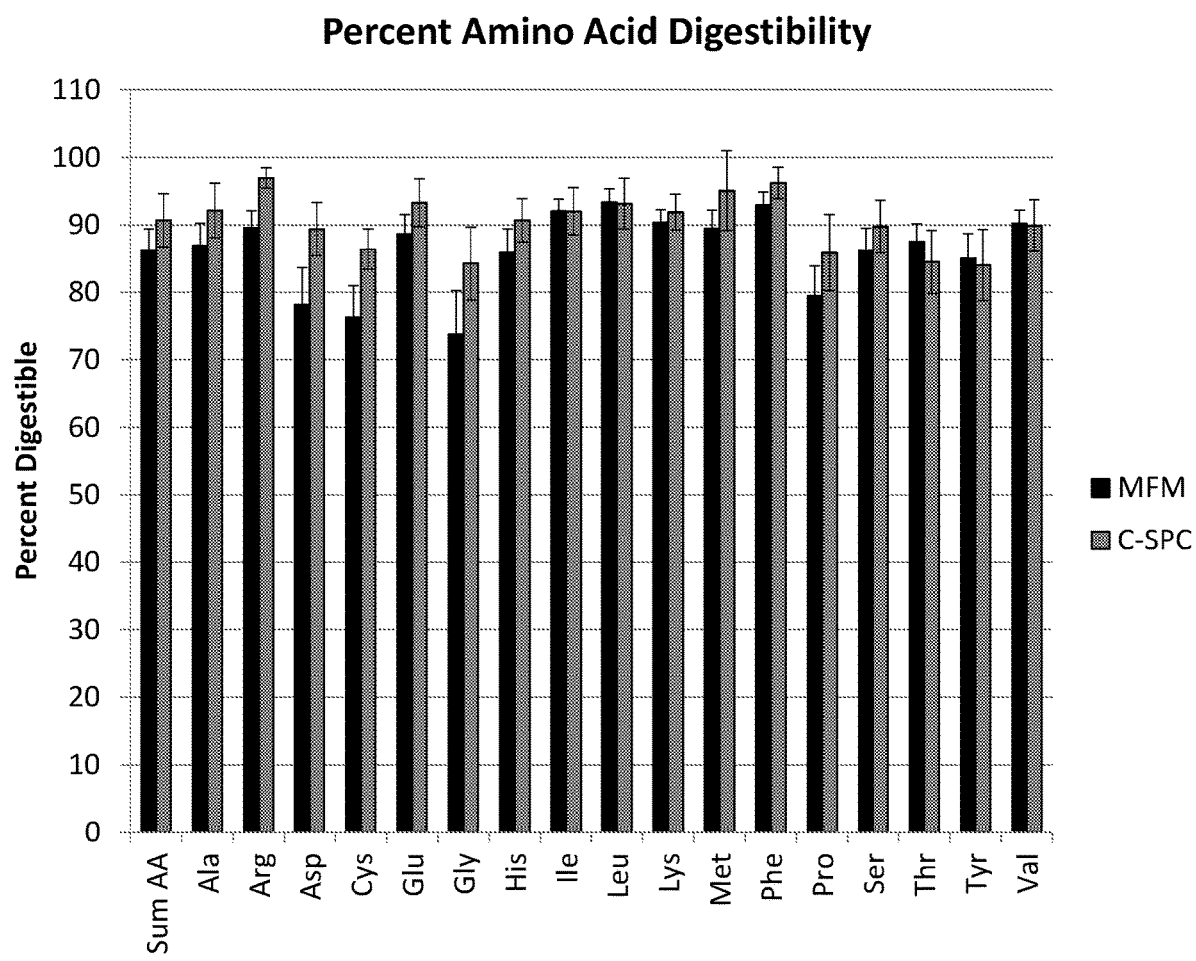
FIG. 4 is a graph showing the average amino acid digestibility across 3 replicate tanks for Menhaden Fishmeal (MFM, left bars) and a protein concentrate according to one embodiment of the present invention (C-SPC, right bars).

Amino acid digestibility was determined by substituting 30% of the reference diet with test ingredient and calculating the difference in each amino acid digested as measured in the stripped fecal material. As shown in FIG. 4, C-SPC demonstrated greater than 90% amino acid digestibility (Sum AA). In comparison to MFM, C-SPC was equivalent or had better amino acid digestibility than MFM.

CONCLUSION

The C-SPC developed using acidified corn steep liquor to remove soluble carbohydrates, i.e., the protein concentrate according to an embodiment of the present disclosure, demonstrated good amino acid digestibility. Further, a combination of Empyreal™75 with C-SPC provides for a robust AA profile and may have higher value than other protein ingredients due to better digestibility.

Example 7: Determination of Amino Acid Digestibility and True Metabolizable Energy (TME)

Amino acid digestibility is determined in caged cecectomized Single Comb White Leghorn roosters and $TME_n$ is determined in conventional (intact) roosters. Both can be determined in cecectomized roosters if less accurate $TME_n$ values are acceptable. Roosters are fasted for 24 hours and are then tube-fed (into crop) 30 g of test feed ingredient. A tray is placed under each cage and all excreta are collected for 48 hours. The excreta are then freeze-dried, weighed and ground and then analyzed for amino acids (for amino acid digestibility) or gross energy and nitrogen (for $TME_n$). True amino acid digestibility and $TME_n$ are then calculated using amino acid and energy excretion by fasted roosters for an endogenous correction. Results are shown in Tables 10 and 11.

TABLE 10

True Metabolizable Energy Evaluation

| Sample | Dry Matter of feed (%) | Gross Energy of feed as-is(kcal/g) | $TME_n$ (kcal/g DM) |
|---|---|---|---|
| C-SPC | 93.6 | 4.770 | 3.294 |

TABLE 11

True Amino Acid Digestibilities (%)

| Amino Acid | C-SPC |
|---|---|
| ASP | 94.17 |
| THR | 92.25 |
| SER | 94.65 |
| GLU | 94.40 |
| PRO | 91.99 |
| ALA | 92.94 |
| CYS | 90.57 |
| VAL | 94.92 |
| MET | 95.49 |
| ILE | 95.17 |
| LEU | 95.32 |
| TYR | 97.73 |
| PHE | 95.35 |
| LYS | 86.39 |
| HIS | 90.14 |
| ARG | 92.06 |
| TRP | 97.80 |

Example 8: Colorimetry Analysis of Feed Ingredients

Figure 5:
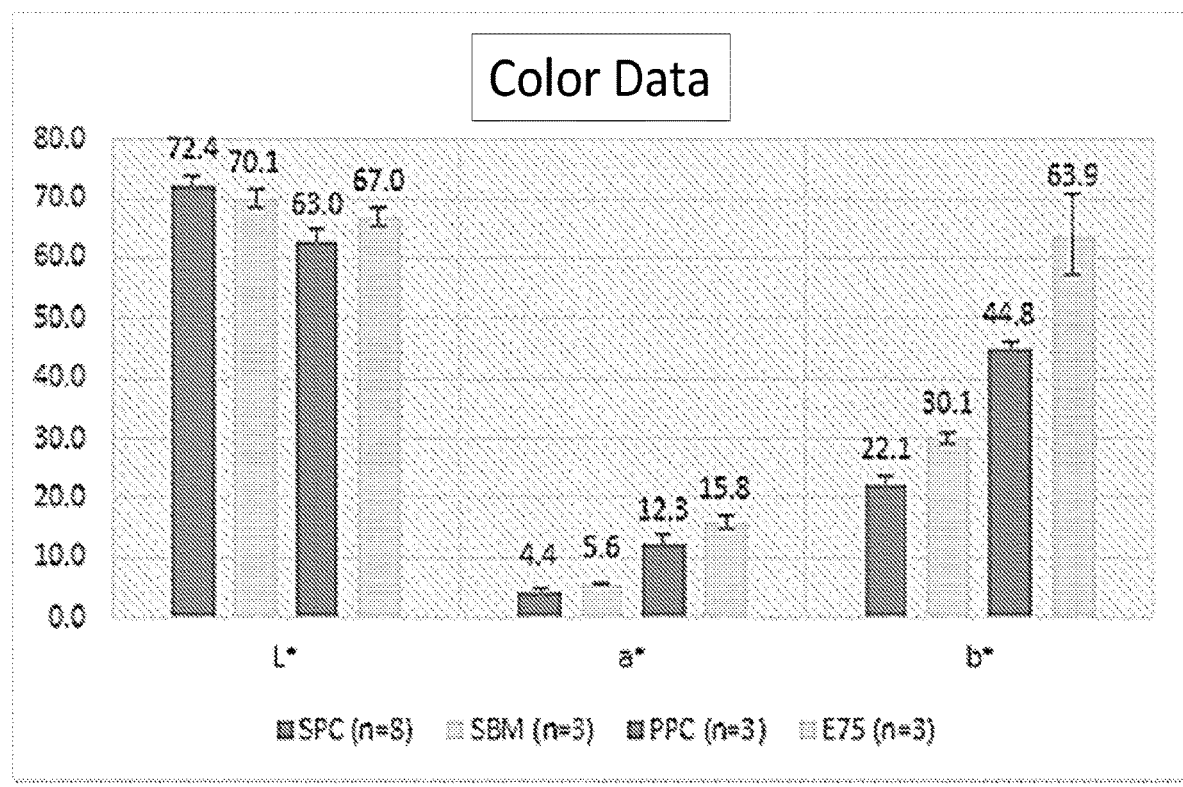
FIG. 5 is a graph showing color data for selected feed ingredients. Left-to-right for each set bars: SPC (Soy Protein Concentrate according to an embodiment of the present invention); SBM (Soy Bean Meal); PPC (Plant Protein Concentrate according to an embodiment of the present invention); E75 (Empyreal™ corn protein concentrate).

A HunterLab Colorimeter (model #CFE2) was used to measure color of SBM, SPC, Empyreal™, and PPC (combination of PPC and Empyreal™) dry powders. The colorimeter reads in the Hunter L*, a*, b* scales:
  L* value represents the white/black color of the visible spectrum. A higher positive value indicates a whiter product.
  a* value represents the red/green spectrum. A higher positive value indicates a reddish product.
  b* value represents the yellow/blue spectrum. A higher positive value indicates a yellowish product.
All measurements were performed in triplicate on every lot and averages are reported (FIG. 5). Based on visual inspection, SBM and SPC materials have a beige color while Empyreal™ and PPC materials have a yellow/orange color. A decrease in a* and b* was detected upon mixing Empyreal™ 75 with SPC (the PPC was made at bench scale). Notably, the SPC had the highest L* value, indicating the whitest product, and also the lowest a* and b* values, indicating the lowest amount of undesirable color of the materials.

The disclosures of each and every patent, patent application, or publication cited herein are hereby incorporated by reference in their entirety. While this invention has been disclosed with reference to specific embodiments, other embodiments and variations of this invention may be devised by others skilled in the art without departing from the true spirit and scope of the invention. The appended claims are intended to be construed to include all such embodiments and variations. The elements or aspects of any embodiment of the methods or compositions described throughout herein can be applied to any other embodiment, as would be understood by a person skilled in the art.

The invention claimed is:

1. A method of preparing a protein concentrate, the method comprising:
   combining a steeping media and an oil seed material to provide a slurry, wherein the steeping media comprises a soluble protein having a different protein and amino acid profile than the oil seed material prior to combining with the oil seed material;
   optionally adjusting the pH of the slurry;
   optionally adding one or more enzymes to the steeping media or the slurry;
   steeping the slurry;
   isolating a protein concentrate from the slurry,
   washing the isolated protein concentrate with a wash media one or more times, and
   drying the isolated protein concentrate,
   wherein the oil seed material is selected from the group consisting of a soy flake, a soy flour, a soy meal, and combinations thereof.

2. The method of claim 1, wherein the soy flake, the soy flour, or the soy meal is defatted.

3. The method of claim 1, wherein the steeping media comprises water.

4. The method of claim 1, wherein the steeping media is selected from the group consisting of a corn steepwater stream, a wheat steepwater stream, a pulse steepwater stream, and combinations thereof.

5. The method of claim 1, wherein the steeping media is a recycled wash media from a protein concentrate preparation process.

6. The method of claim 1, wherein the steeping media has a solids content of less than about 20% dry solids by weight.

7. The method of claim 1, wherein the wash media is water.

8. The method of claim 1, wherein the wash media is selected from the group consisting of a corn steepwater stream, a soy steepwater stream, a wheat steepwater stream, a pulse steepwater stream, and combinations thereof.

9. The method of claim 1, wherein the pH of the slurry or steeping media is adjusted to the range of about 3.8 to 4.2.

10. The method of claim 1, wherein the pH of the wash media is adjusted to the range of about 3.8 to 4.2.

11. The method of claim 1, wherein the pH of the slurry during the steeping step is maintained in the range of about 3.8 to 4.2.

12. The method of claim 1, wherein the washing step comprises a wash volume ratio of about 1:1 volume of wash media to volume of isolated protein concentrate.

13. The method of claim 1, wherein the one or more enzymes is selected from the group consisting of a glucanse, a xylanase, a cellulase, a hemicellulase, an amylase, an alpha-galactosidase, a hemicellulase, a pectinase, a polygalacturonase, a phytase, and a protease, and combinations thereof.

14. The method of claim 1, wherein the protein concentrate comprises at least about 60% protein on a dry weight basis.

15. The method of claim 1, wherein the protein concentrate has a Trypsin Inhibitor content of less than 6 TIU/mg.

16. The method of claim 1, wherein the protein concentrate has less than 0.2% Stachyose.

17. The method of claim 1, wherein the protein concentrate has less than 0.2% Raffinose.

18. The method of claim 1, wherein the protein concentrate has less than 2% Phytic Acid.

19. The method of claim 1, further comprising co-drying the protein concentrate with a corn protein concentrate.

* * * * *